United States Patent [19]

Becker

[11] Patent Number: 5,052,919

[45] Date of Patent: Oct. 1, 1991

[54] MUTI-STAGE COMBUSTION CHAMBER FOR COMBUSTION OF NITROGEN-CONTAINING GAS WITH REDUCED $NO_x$ EMISSIONS, AND METHOD FOR ITS OPERATION

[75] Inventor: Bernard Becker, Mülheim/Ruhr, Fed. Rep. of Germany

[73] Assignee: Siemens Aktiengesellschaft, Munich, Fed. Rep. of Germany

[21] Appl. No.: 643,439

[22] Filed: Jan. 22, 1991

Related U.S. Application Data

[62] Division of Ser. No. 945,300, Dec. 19, 1986, Pat. No. 5,002,483.

[30] Foreign Application Priority Data

Dec. 20, 1985 [DE] Fed. Rep. of Germany ....... 3545524

[51] Int. Cl.⁵ .............................................. F23M 3/04
[52] U.S. Cl. ..................................... 431/10; 431/352; 60/732

[58] Field of Search ............... 431/351, 352, 10, 4; 60/732, 39.55

[56] References Cited

U.S. PATENT DOCUMENTS 2,636,345  4/1953  Zoller ............................... 60/39.55
2,770,097  11/1956  Walker ............................. 60/39.55

Primary Examiner—Carroll B. Dority
Attorney, Agent, or Firm—Herbert L. Lerner; Laurence A. Greenberg

[57] ABSTRACT

Two-stage combustion of nitrogen-containing gas with low $NO_x$ emissions, in a combustion chamber, wherein first, pre-combustion is performed in a primary stage at an air number of approximately $\lambda = 0.6$ to 0.9 and subsequently post-combustion is performed in a secondary stage at an air number of approximately $\lambda = 1.3$ to 2, characterized in that in the primary stage, an inert substance is supplied via a multiplicity of openings in the walls of the primary stage, which substance cools the walls and keeps the combustion zone remote from the walls.

7 Claims, 1 Drawing Sheet

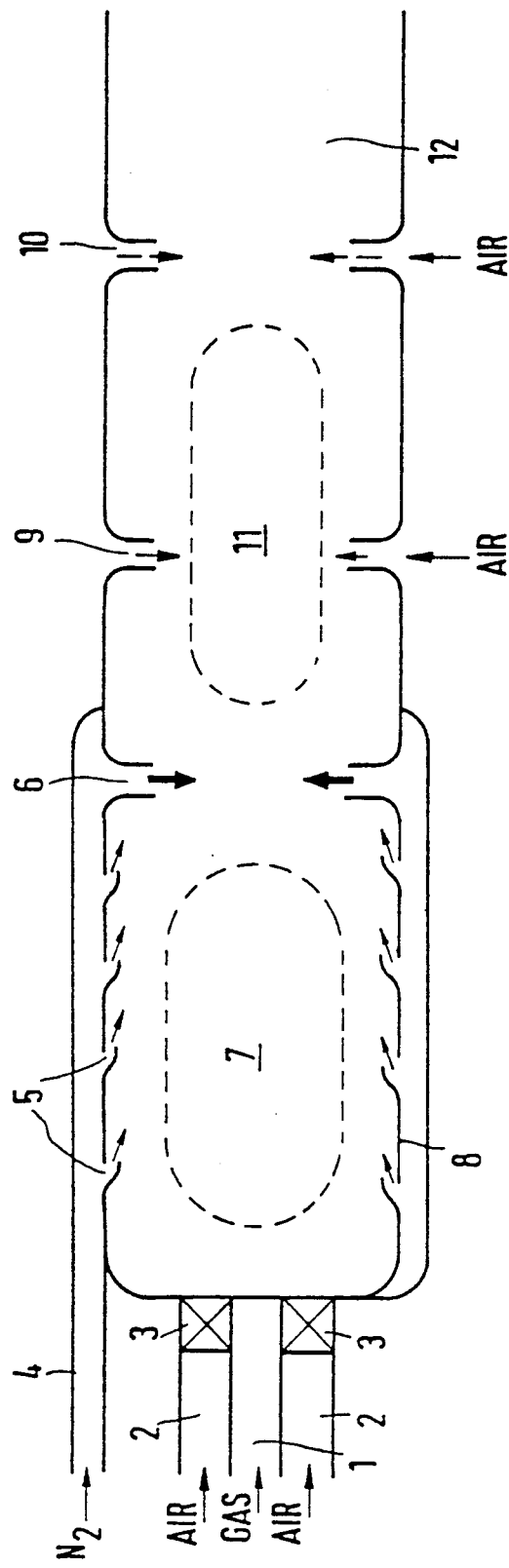

MUTI-STAGE COMBUSTION CHAMBER FOR COMBUSTION OF NITROGEN-CONTAINING GAS WITH REDUCED $NO_x$ EMISSIONS, AND METHOD FOR ITS OPERATION

This is a division of application Ser. No. 945,300, filed Dec. 19, 1986 and now U.S. Pat. No. 5,002,483.

BACKGROUND OF THE INVENTION

1. Field of the Invention

The present invention re chamber and to a method for operating the combustion chamber for combustion of nitrogen-containing gas with low $NO_x$ emissions in which combustion chamber there is at least one primary stage for precombustion of a fuel-rich mixture having an air number approximately in the range of $\lambda = 0.6$ to 0.9, wherein gas and air forming the fuel-rich mixture are supplied to the primary stage via a gas inlet and an air inlet to the combustion chamber or optionally the gas and the air can be premixed and the resultant fuel-rich mixture fed via a mixture inlet to the primary stage wherein partial combustion of the fuel-rich mixture takes place, and at least one succeeding secondary stage in the combustion chamber in open communication with the primary stage for the flow of reaction products from the primary stage to the secondary stage, wherein in the latter post-combustion of the reaction products from the primary stage occurs at high air excess, an air number approximately in the range of $\lambda = 1.3$ to 2.

2. Description of the Prior Art

In the gasification of coal with oxygen, for instance, a gas having an average calorific value is produced, which contains fuel-bound nitrogen in the form of $NH_3$ and HCN. Some other fuels also contain nitrogen in bound form. If such a fuel is combusted in a standard combustion chamber, a great deal of $NO_x$ is produced because of the oxidation of the atomic nitrogen set free during combustion. The maximum temperatures in a diffusion flame can also become so high that a great deal of thermal $NO_x$ is produced. Various ways of solving this problem are known; for instance, $NH_3$ and HCN can be removed by scrubbing the gas before combustion takes place. However, this involves a considerable expenditure for gas purification.

The following source in the literature provides an overview of the background and field of the prior art in stationary gas turbines:

Final report, "ADVANCED COMBUSTION SYSTEMS FOR STATIONARY GAS TURBINE ENGINES", Volumes I, II, III and IV, by R. M. Pierce et al, Pratty & Whitney Aircraft Group, Government Products Division, United Technologies Corporation, West Palm Beach, Fla. 33402; Contract No. 68-02-2136; prepared for U.S. Environmental Protection Agency, Office of Research and Development, Washington, D.C. 20460, No. FR-11405, Mar. 31, 1980.

Pages 2 ff. of Volume III of this reference describes a concept for combustion of fuels having bound nitrogen. In this concept, pre-combustion of a fuel-rich mixture first takes place in a primary stage, and then remaining combustion is done with a high air excess in a secondary stage. A pre-mixing chamber is also provided in this concept.

In a publication of the American Society of Mechanical Engineers (ASME), No. 82-GT-29, entitled "Alternative Fuels: Burner Concepts and Emission Characteristics of a Silo Combustor", by W. Krockow and H. Schabbehard, the influence of various procisions on $NO_x$ generation in the combustion of fuel having bound nitrogen is discussed. From this discussion, it is known that a high proportion of inert substances, such as molecular nitrogen, decreases $NO_x$ production. Because of the high calorific value of such a mixture, all the reactions take their course at a low temperature level and hence very slowly. As a result, large combustion chambers having large surface areas are required, which entails cooling problems, or else the rate of recombination of atomic nitrogen into $N_2$ that is attained is too low.

The above-described combustion in two stages has the advantage that in the first, fuel-rich primary combustion chamber with an air number of $\lambda = 0.6$ to 0.9, the fuel decomposes, where-upon N recombines, predominantly to $N_2$, since only a little NO can be produced because of the oxygen deficiency. Nevertheless, the high temperatures in the primary combustion chamber entail major cooling problems, because inflowing air reacts and generates high temperatures near the wall. When air is admixed for the after-burning in the vicinity of an air number $\lambda \approx 1$, a very great quantity of thermal $NO_x$ is also produced; nor can this be completely avoided by the rapid admixture of air.

In Volume II of the above-cited reference, "ADVANCED COMBUSTION SYSTEMS...", cooling systems for a primary combustion chamber are described, for instance on pages 10 and 11; however, the provisions described there are costly and also entail various problems, for instance if water is used as a coolant.

SUMMARY OF THE INVENTION

An object of the present invention is to provide a combustion chamber for the combustion of nitrogen-containing gas, with low $NO_x$ emissions, which while having a small structural volume avoids the disadvantages of the prior art, and to describe a method for operating a combustion chamber of this kind.

With the foregoing and other objects in view, there is provided in accordance with the invention a combustion chamber for the combustion of nitrogen-containing gas with low $NO_x$ emissions, comprising a combustion chamber having a precombustion section for at least one primary stage for precombustion of a fuel-rich mixture having an air number approximately in the range of $\lambda = 0.6$ to 0.9, inlet means to the precombustion section for the introduction of a gas and air in separate streams or as a mixture of gas and air, a secondary combustion section for at least one secondary stage for secondary combustion at high air excess, approximately in the range of $\lambda = 1.3$ to 2, of the products from the precombustion section, the combination therewith of a multiplicity of inert substance inlet openings distributed over the walls of the precombustion section of the combustion chamber, an inert substance supply system communicating with the inert substance inlet openings for feeding an inert substance therethrough.

There is provided in accordance with the invention a method for a two-stage combustion of nitrogen-containing gas with low $NO_x$ emissions, in a combustion chamber having a precombustion section with inlet means for introduction of gas and air, and a succeeding secondary combustion section in open communication with the precombustion section, which comprises, introducing gas and air to a primary stage in the precombustion section to provide a fuel-rich mixture and effecting precombustion of the mixture at an air number of approximately $\lambda = 0.6$ to 0.9, subsequently subjecting the reaction products from the primary stage to post-combustion in a secondary stage in the secondary combustion section at an air number of approximately $\lambda = 1.3$ to 2, and feeding an inert substance via a multiplicity of openings in the walls of the precombustion section to cool the walls and separate the walls from the fuel-rich mixture undergoing decomposition and precombustion in the primary stage.

Other features which are considered as characteristic for the invention are set forth in the appended claims.

Although the invention is illustrated and described herein as embodied in multi-stage combustion chamber for combustion of nitrogen-containing gas with reduced $NO_x$ emissions, and method for its operation, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with, the accompanying drawing which diagrammatically illustrates a combustion chamber into which is fed gas and air through inlets to form a fuel-rich mixture which is subjected to precombustion in a primary stage in a first section of the combustion chamber. The walls of the chamber of the first section are surrounded by a nitrogen supply system which feeds nitrogen through a multiplicity of holes in the wall to form a layer of nitrogen separating and shielding the wall from the fuel-rich mixture undergoing decomposition and precombustion in the primary stage. Further nitrogen is supplied to inlet openings in the vicinity of the end of the primary stages and the mixture of nitrogen and reaction products from the primary stage flow to a secondary stage in a second section of the chamber to which excess air is added. Additional air is added in the vicinity of the end of the secondary stage.

DESCRIPTION OF THE PREFERRED EMBODIMENTS

The present invention relates to a combustion chamber for combustion of nitrogen-containing gas with low $NO_x$ emissions, comprising at least one primary stage for pre-combustion of a fuel-rich mixture and at least one secondary stage for the remaining combustion at a high air excess, wherein the primary stage has a multiplicity of inlet openings distributed over its walls and communicating with an inert substance supply system.

Nitrogen is preferably used as the inert substance. The supply of nitrogen through the walls of the primary stage positively displaces the combustion zone away from the walls and cools them, so that a compact structure is possible despite a high combustion temperature. Additional inlet openings for nitrogen in the end region of the primary stage enable cooling down of the combustion gases prior to the remaining combustion with air excess in the secondary stage. The combustion chamber according to the invention enables the combustion of fuels having bound nitrogen with reduced $NO_x$ emissions. As will be described in further detail in conjunction with the drawing, the present invention combines two substantial routes toward reducing $NO_x$ emissions in a particularly effective manner.

First, the principal route of multi-stage combustion, including a fuel-rich primary stage, is taken. To enable keeping the structural volume of the primary stage small despite high combustion temperatures, however, and to protect the walls from overheating, the primary stage is surrounded by an inert-substance supply system, and its walls have a large number of openings for admitting an inert substance, such as nitrogen. Other inert substances may be employed such as $CO_2$ and $H_2O$ vapor, in whole or in part, but nitrogen is the preferred inert substance. The openings are shaped such that the inert substance flows along the walls, parallel to the combustion gases. In this manner, the combustion zone is positively displaced away from the walls, because there is no oxygen near the walls, and at the same time the walls are cooled by the inflowing inert substance. The two effects together reduce the wall temperatures quite considerably, although high combustion temperatures may prevail in the interior of the primary stage. In principle, the remaining combustion can then be effected analogously to how it is done in the known apparatuses.

It is particularly favorable, however, also to supply an additional quantity of inert substances at the end of the primary stage, before the remaining combustion takes place. By supplying further inert substances at the end of the primary stage, the temperature is lowered, before a fuel/air mixture having an air number of $\lambda \approx 1$ is attained. This makes it possible to reduce the thermal $NO_x$. The selection of the separately supplied inert substance may in principle be made in accordance with the fuel used; for nitrogen-containing coal gases, the nitrogen that usually is already available from the air separation plant can preferably be used. The air number designated $\lambda$ is the ratio of air to fuel relative to a stoichiometric ratio of air to fuel which is given the value of 1.

For some applications, it is not absolutely necessary to supply inert substances and air separately downstream of the primary stage, because supplying both substances in common has substantial advantages.

An examplary embodiment of the invention is shown in schematic form in the drawing; for the sake of simplicity, any elements that are conventionally present in gas turbines but are not required for comprehension of the invention have been omitted from the drawing.

The drawing shows a combustion chamber, which in principle has two stages, namely a primary stage 7, for pre-combustion of a fuel-rich mixture, and a secondary stage 11, for the remaining combustion. Through a gas inlet 1 and an air inlet 2, which is provided with a swirl star 3 to improve mixing, a fuel-rich mixture is brought about in the primary stage 7. The walls 8 of the primary stage 7 are surrounded by a nitrogen supply system 4 and have openings 5, through which nitrogen can flow into the primary stage 7. The openings 5 are shaped such that the nitrogen preferentially flows in along the walls 8 in the flow direction of the combustion gases, thereby forming a protective jacket in the vicinity of the walls 8. This jacket positively displaces the combustion zone away from the walls 8, and the entering nitrogen also effects additional cooling of the walls. The two effects taken together effect such a marked thermal relief of the walls that the primary stage can be made very compact in structure, despite the high combustion temperatures prevailing in it. The supplied nitrogen does not impair the combustion process in the primary stage, yet it has a positive effect during the remaining combustion, by hindering the formation of thermal $NO_x$. To reinforce this effect still further and to provide initial cooling of the combustion gases downstream of the primary stage, the primary stage has further inlet openings 6 in the vicinity of its end, for the supply of still further quantities of nitrogen. Only after this additional nitrogen has mixed with the combustion gases and cooled them is further air admixed via air inlets 9, so that the remaining combustion can take place with an air excess. With these provisions, only small proportions of $NO_x$ are produced in the secondary stage 11 as well. If necessary, mixed air, i.e. a mixture of air and inert substance, can be added to the exhaust gases through further inlets 10 upstream of the outlet 12 from the combustion chamber.

The exemplary embodiment described here is by no means the only possible way of realizing the invention. Cooling of a primary stage for pre-combustion of a fuel-rich mixture by supplying inert substances to the wall region can also be realized in combination with other apparatus. For instance, the primary stage may be preceded by a pre-mixing system, although the present invention is particularly well suited for obviating such a provision. Optionally, inert substances and air in combination may be fed to the region between the primary and secondary stages, should other considerations, such as structural length, require this. The gaseous reaction products in admixture with an inert substance upon entry, into the secondary stage desirably contains approximately 10 to 70% by weight nitrogen as an inert substance based on the weight of the mixture upon entry into the secondary stage. The desired percentage of nitrogen in the mixture may be readily controlled by regulating the amount of nitrogen introduced to the region between the primary and secondary stages.

The foregoing is a description corresponding in substance to German Application P 35 45 524.1, dated Dec. 20, 1985, the International priority of which is being claimed for the instant application, and which is hereby made part of this application. Any material discrepancies between the fore-going specification and the aforementioned corresponding German application are to be resolved in favor of the latter.

I claim:

1. A method for a two-stage combustion of nitrogen-containing gas with low $NO_x$ emissions, in a combustion chamber having a precombustion section with inlet means for introduction of gas and air, and a succeeding secondary combustion section in open communication with the precombustion section, which comprises, introducing gas and air to a primary stage in the precombustion section to provide a fuel-rich mixture and effecting precombustion of the mixture at an air number of approximately $=0.6$ to 0.9, subsequently subjecting the reaction products from the primary stage to post-combustion in a secondary stage in the secondary combustion section at an air number of approximately $\lambda=1.3$ to 2, and feeding an inert substance via a multiplicity of openings in the walls of the precombustion section to cool the walls and separate the walls from the fuel-rich mixture undergoing decomposition and precombustion in the primary stage.

2. A method as defined by claim 1, wherein nitrogen is used as the inert substance.

3. A method as defined by claim 1, wherein steam is used as the inert substance when the fuel-rich mixture has as its fuel component a fuel which does not contain nitrogen.

4. A method as defined by claim 1, wherein in an end region of the primary stage, additional quantities of inert substance are fed into the reaction products of the primary stage, before the post combustion in the secondary stage begins.

5. A method as defined by claim 1, wherein that in an end region of the primary stage, a mixture of inert substance and air is fed into the reaction products of the primary stage, before post-combustion in the secondary stage begins.

6. A method as defined by claim 4, wherein nitrogen serves as the inert substance, and the proportion thereof with the reaction products upon entry into the secondary stage amounts to approximately from 10 to 70% by weight.

7. A method as defined by claim 5, wherein nitrogen serves as the inert substance, and the proportion thereof with the reaction products entry into the secondary stage amounts to approximately from 10 to 70% by weight.

* * * * *